(12) United States Patent
Cormier et al.

(10) Patent No.: US 9,528,280 B2
(45) Date of Patent: Dec. 27, 2016

(54) SURFACE UNDERLAYMENT SYSTEM WITH INTERLOCKING RESILIENT ANTI-SLIP SHOCK TILES

(71) Applicant: VICONIC SPORTING LLC, Dearborn, MI (US)

(72) Inventors: Joel M. Cormier, Lathrup Village, MI (US); Donald S. Smith, Commerce, MI (US); Richard F. Audi, Dearborn, MI (US); Dane R. Winbigler, Harper Woods, MI (US)

(73) Assignee: Viconic Sporting LLC, Dearborn, MI (US)

( * ) Notice: Subject to any disclaimer, the term of this patent is extended or adjusted under 35 U.S.C. 154(b) by 0 days.

(21) Appl. No.: 15/006,458

(22) Filed: Jan. 26, 2016

(65) Prior Publication Data
US 2016/0138275 A1    May 19, 2016

Related U.S. Application Data

(63) Continuation-in-part of application No. 14/533,438, filed on Nov. 5, 2014, and a continuation-in-part of
(Continued)

(51) Int. Cl.
*E04F 15/22* (2006.01)
*E01C 13/04* (2006.01)
(Continued)

(52) U.S. Cl.
CPC ........... *E04F 15/225* (2013.01); *E01C 13/045* (2013.01); *E04F 15/22* (2013.01); *B29C 51/00* (2013.01);
(Continued)

(58) Field of Classification Search
CPC ............... E04F 15/225; E04F 15/02177; E04F 2201/095; E04F 2290/044; E04F 2203/00; B29C 45/14; B29C 51/02; B29L 2031/7324
See application file for complete search history.

(56) References Cited

U.S. PATENT DOCUMENTS 2,275,575 A * 3/1942 Vrooman ........... A47G 27/0412
428/167
2,434,641 A * 1/1948 Burns ................... A47C 27/081
114/219
(Continued)

FOREIGN PATENT DOCUMENTS

EP      2154291 A1    2/2010
JP      50-136582     10/1975
(Continued)

OTHER PUBLICATIONS

International Search Report and Written Opinion; International application No. PCT/US2014/031333; date of mailing Jul. 24, 2014.
(Continued)

*Primary Examiner* — Jeanette E Chapman
(74) *Attorney, Agent, or Firm* — Brooks Kushman P.C.

(57) ABSTRACT

A modular energy absorbing system sandwiched between an impact-receiving upper surface and a lower foundation. The energy absorbing system has one or more interconnected modules that cooperate to absorb and distribute impact forces applied thereto. Each module has one or more frustoconical support structures. At least some of the frustoconical support structures have bases that underlie the upper impact-receiving surface such as a football field or a basketball court.

15 Claims, 10 Drawing Sheets

Related U.S. Application Data application No. 13/865,483, filed on Apr. 18, 2013, now Pat. No. 9,194,136.

(51) Int. Cl.
*E04F 15/02* (2006.01)
*B29L 31/00* (2006.01)
*B29C 51/00* (2006.01)

(52) U.S. Cl.
CPC .. *B29L 2031/7138* (2013.01); *E04F 15/02183* (2013.01); *E04F 2201/0138* (2013.01); *E04F 2201/021* (2013.01); *E04F 2290/044* (2013.01)

(56) References Cited

U.S. PATENT DOCUMENTS

| | | | |
|---|---|---|---|
| 3,231,454 A | 1/1966 | Williams | |
| 3,876,492 A | 4/1975 | Schott | |
| 4,233,793 A * | 11/1980 | Omholt | E04F 15/04 52/390 |
| 4,890,877 A | 1/1990 | Ashtiani-Zarandi et al. | |
| 5,030,501 A * | 7/1991 | Colvin | B32B 3/12 206/522 |
| 5,383,314 A | 1/1995 | Rothberg | |
| 5,399,406 A * | 3/1995 | Matsuo | B32B 3/12 428/166 |
| 5,619,832 A | 4/1997 | Myrvold | |
| 6,715,592 B2 | 4/2004 | Suzuki et al. | |
| 6,777,062 B2 | 8/2004 | Skaja | |
| 7,033,666 B2 | 4/2006 | Skaja | |
| 7,441,758 B2 * | 10/2008 | Coffield | A47C 5/12 267/142 |
| 7,574,760 B2 | 8/2009 | Foley et al. | |
| 7,866,248 B2 | 1/2011 | Moore, III et al. | |
| 8,221,856 B2 | 7/2012 | Stroppiana | |
| 8,568,840 B2 | 10/2013 | Sawyer et al. | |
| 8,777,191 B2 * | 7/2014 | Kligerman | F16F 1/373 188/371 |
| 2002/0017805 A1 * | 2/2002 | Carroll, III | A62B 1/22 296/187.03 |
| 2005/0133324 A1 | 6/2005 | Soto Bailon et al. | |
| 2005/0200062 A1 | 9/2005 | Maurer et al. | |
| 2005/0281987 A1 | 12/2005 | Starke | |
| 2011/0135852 A1 | 6/2011 | Sawyer | |
| 2014/0311074 A1 | 10/2014 | Cormier et al. | |
| 2014/0311075 A1 | 10/2014 | Cormier et al. | |

FOREIGN PATENT DOCUMENTS

| | | |
|---|---|---|
| JP | 9150692 A | 11/1995 |
| JP | 08085404 | 4/1996 |
| JP | 11348699 | 12/1999 |
| WO | 9300845 A1 | 1/1993 |
| WO | 9711825 A3 | 4/1997 |
| WO | 0031434 | 6/2000 |
| WO | 2013183989 A1 | 12/2013 |

OTHER PUBLICATIONS

International Search Report and Written Opinion; International application No. PCT/US2015/014570 date of mailing May 14, 2015.

International Search Report and Written Opinion; International application No. PCT/US2015/016103; date of mailing May 15, 2015.

Notice of Allowance and Fee(s) Due; corresponding U.S. Appl. No. 13/865,483; date mailed Aug. 18, 2015.

International Preliminary Report on Patentability; corresponding International application No. PCT/2014/031333; date of issuance of report Oct. 20, 2015.

* cited by examiner

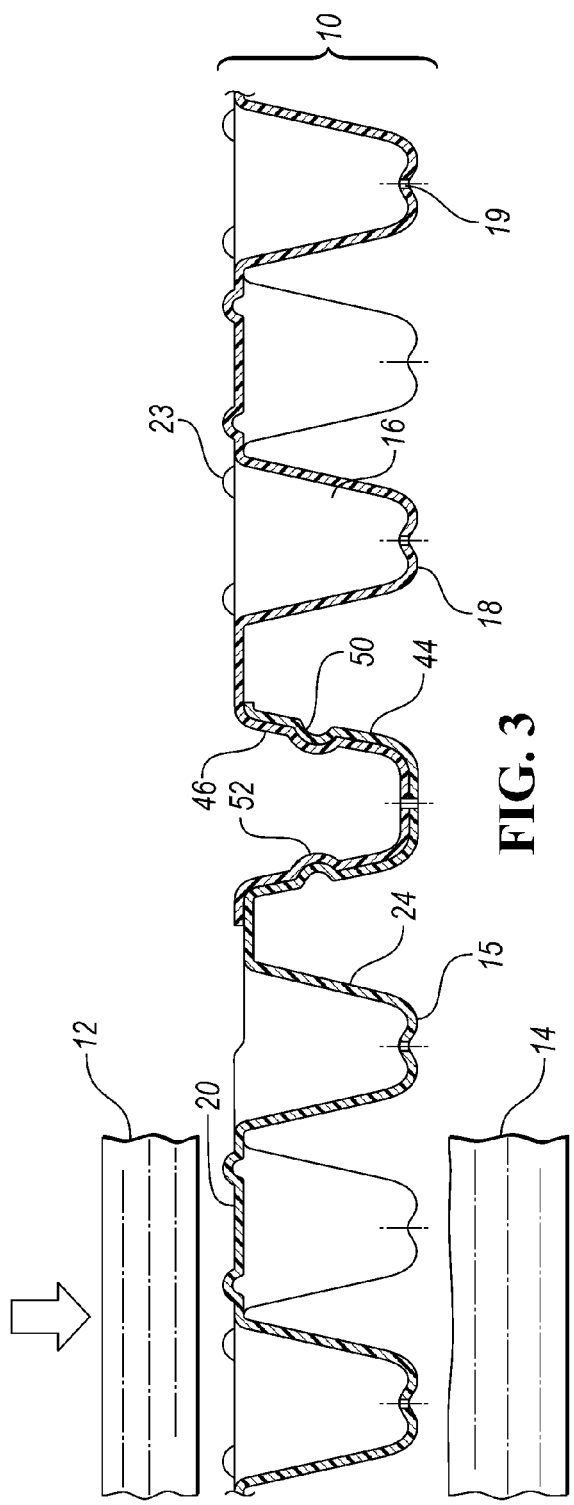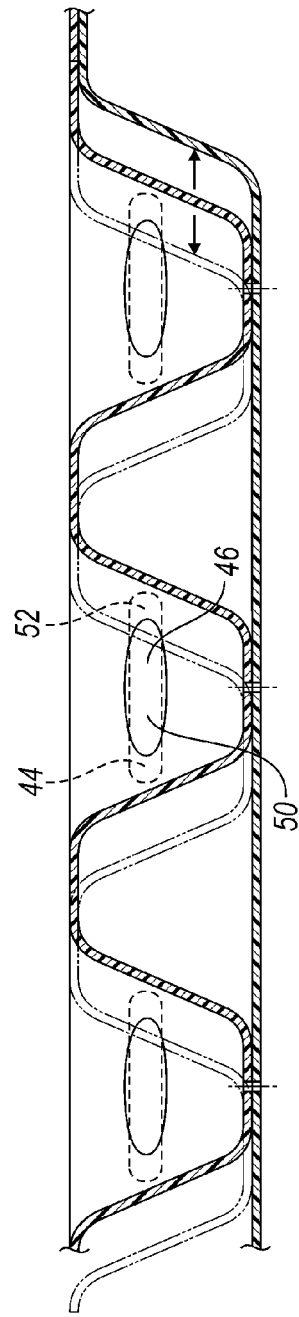

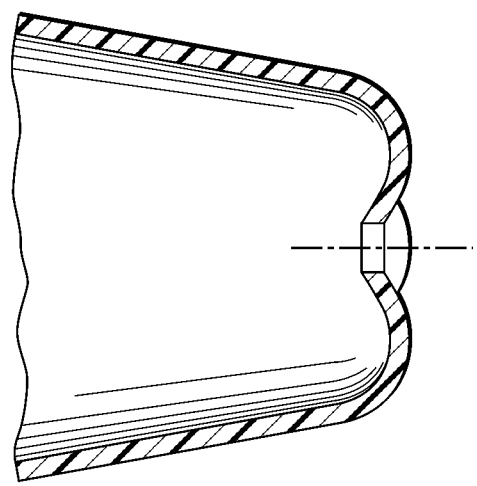
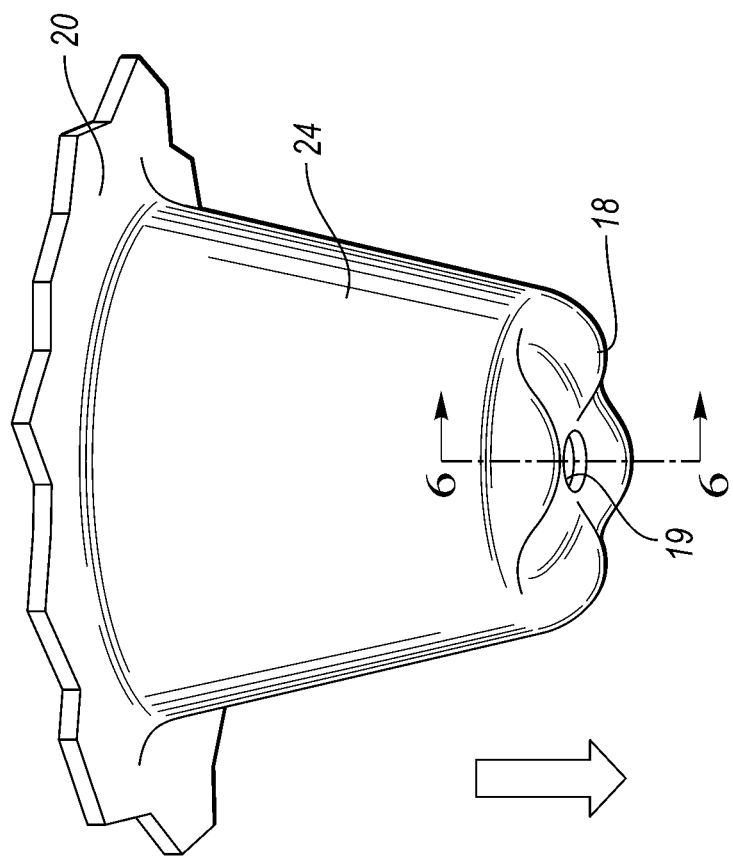

SURFACE UNDERLAYMENT SYSTEM WITH INTERLOCKING RESILIENT ANTI-SLIP SHOCK TILES

CROSS REFERENCE TO RELATED APPLICATION

This application is a Continuation-In-Part of U.S. Ser. No. 14/533,438 filed on Nov. 5, 2014 and Ser. No. 13/865,483 filed on Apr. 18, 2013, the disclosures of which are incorporated herein by reference in their entirety

TECHNICAL FIELD

Several embodiments of this disclosure relate to articles of manufacture and methods for providing a surface underlayment system with interlocking resilient anti-slip shock tiles or modules.

BACKGROUND

To reduce injury in sporting events, a playing surface is sometimes provided with an underlayment system that absorbs and redistributes energy, thereby cushioning the blow when for example a player falls to the ground after being tackled. In an industrial setting, flooring systems are sometimes provided that absorb forces generated by repeated footfalls. Playground systems also require some means of absorbing energy to reduce the risk of serious injury when a child falls on the surfaces beneath and around playground structures.

Against this background, it would be desirable to provide an article of manufacture and its method of making that includes a surface underlayment system with interlocking resilient anti-slip shock tiles or modules that accommodate thermal expansion or contraction and can be usefully deployed indoors or outdoors in all weather conditions.

Ideally the tiles could be economically nested or stacked before transportation to a job site, would have a minimal installed cost; be compatible with a lower foundation and an upper surface between which they are interposed; and require little to no maintenance.

BRIEF DESCRIPTION OF THE DRAWINGS

FIG. 3 is a sectional view taken along the line 3-3 of FIG. 2;

FIG. 4 is a sectional view taken along the line 4-4 of FIG. 2;

FIG. 5 illustrates a perspective view of an alternate embodiment of a frustoconical energy absorbing support structure;

FIG. 6 is a sectional view thereof along the line 6-6 of FIG. 5;

DETAILED DESCRIPTION

Figure 1:
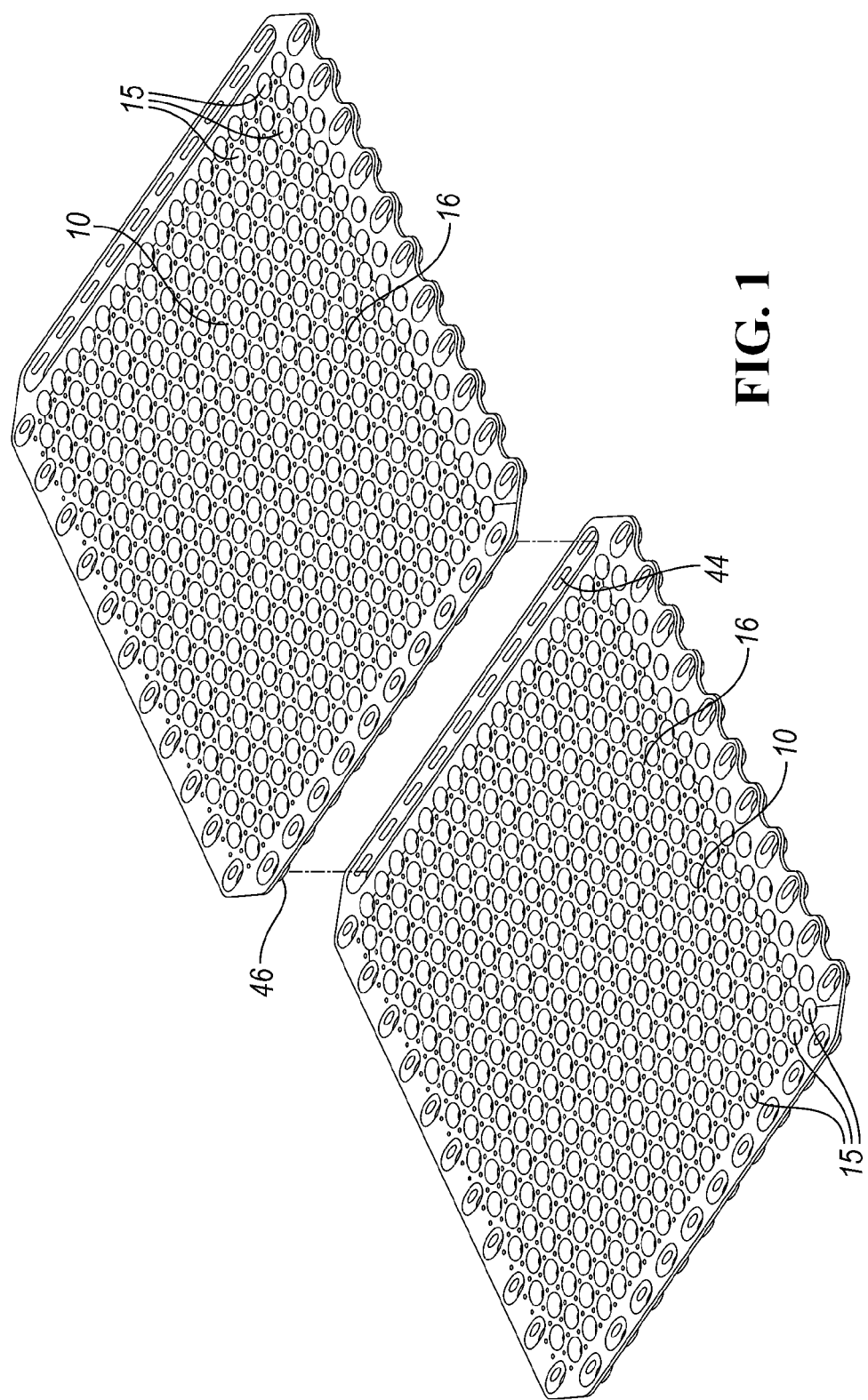
FIG. 1 is an exploded view of a first embodiment that depicts one way in which two adjacent retention system tiles or modules may become interlocked in a partially overlapping configuration.
Figure 2:
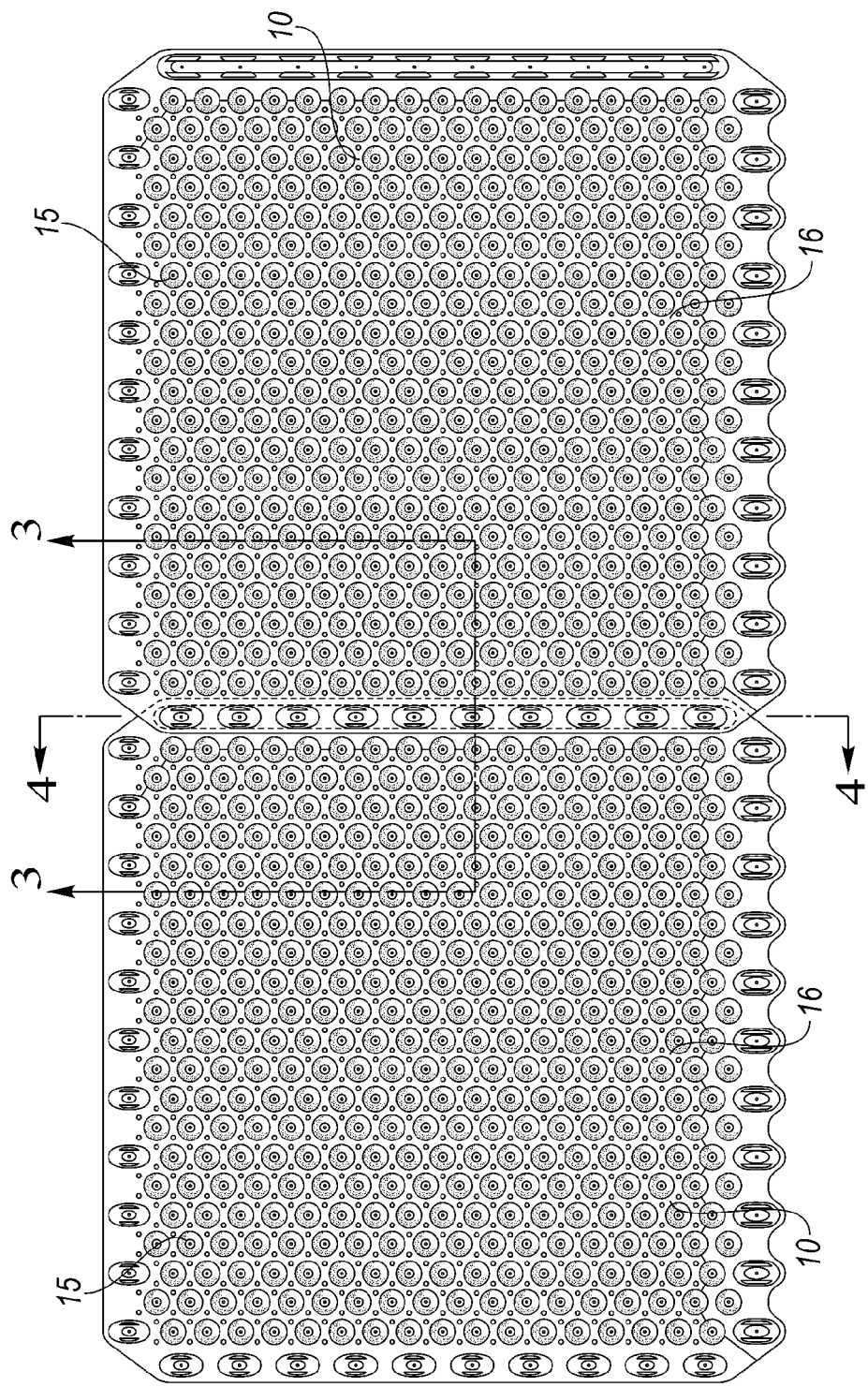
FIG. 2 is a top view which illustrates two modules that have become interlocked.

One aspect of this disclosure involves a first embodiment of a modular surface underlayment system 10 (FIGS. 1-6) that lies between an upper surface 12 and a lower foundation 14 as best shown in FIG. 3. Other embodiments (FIGS. 7-12) are discussed below. In each embodiment, the system 10 has interconnected, preferably one or more thermoplastic tiles or modules 16 that cooperate to manage energy absorption or distribution following a blow imparted to the upper surface 12 from above, while maintaining their structural interrelationship in the face of thermal expansion and contraction responses to changing environmental conditions. Each module 16 is configured to cushion the blow by absorption and/or re-distribution laterally.

In more detail, at least some of the modules 16 have an array of preferably frustoconical energy absorbing support structures 15. Optionally, ribs (not shown) connect at least some of the frustoconical structures 15. As used herein the term "frustoconical" includes a generally conical structure, the end of which has been truncated, perhaps by a planar or undulating surface (bottom surface 18, FIG. 3) that may be parallel or inclined to its top surface 20. The bottom surface 18 is also termed what in the game of chess is sometimes called a "rook".

The bottom surface 18 of the frustoconical energy absorbing support structures 15 may or may not be circular. It could for example be oval, elliptical, square, rectangular, triangular, hexagonal or generally polygonal. Effectively the structures 15 serve as support pillars with sidewalls 24 (FIG. 3) that rise from the bottom surface 18 and are configured to support the weight for instance of a 250 lb. person without collapsing. In response to impact, depending on the impacting force, the sidewalls 24 buckle and may or may not spring back to or towards an undeflected configuration, thereby absorbing or redistributing at least some of the forces that accompany impact upon the upper surface 12.

It will be appreciated that the terms "top", "bottom", "upper" and "lower" should be construed as non-limiting. For example any of the modules 10 could be inverted. In that case the bottom surface 18 could become juxtaposed with and lie below the upper surface 12.

In a preferred embodiment, the top surfaces 20 of the frustoconical structures 15 interface with the upper surface 12, such as an artificial turf or a hard playing surface. The top surfaces 20 are generally planar and are roughly parallel to the bottom surfaces 18. Where the frustoconical structure 15 has a bottom surface 18 that resembles a rook with crenellations, the crenellations have upper edges that are generally co-planar (see, FIGS. 5, 6).

In one preferred embodiment (see, e.g., FIGS. 1-4), the modules 10 provide mutual support. They coordinate with and connect to one another, despite having features described below that accommodate thermal expansion and contraction. To attach adjacent modules 10, oval female troughs or recesses 44 (FIG. 3) are provided in a peripheral edge flange of a module that engage male protuberances 46 in a peripheral edge flange of an adjacent module. The oval female recesses 44 are oriented so that they are preferably substantially aligned with a major component of a direction of thermal expansion and contraction. When a male protuberance 46 is engaged by a female recess 44, unidirectional relative movement therebetween can be accommodated without the buckling of adjacent modules 10.

If desired, lugs 50 and grooves 52 (FIG. 3) can be provided in the walls of male 46 and female 44 members (or vice-versa) to provide a snap-fit engagement mechanism between adjacent modules 10. The lugs 50 and grooves 52 may be defined continuously or intermittently in the sidewall 44, 46. Optionally, a flooring surface 12 can be laminated to the underlayment system 10. In this embodiment, the cone array 15 and male members 46 are covered by the flooring surface 12 and the female members 44 exposed. When the laminated system is snapped together, the sides of the flooring surface butt together, thereby creating a continuous surface.

The modular energy absorbing system 10 may include a number (n) of modules 10 (where 1<n<1,000,000) depending on the desired footprint on the lower foundational surface 14 over which the system 10 is installed.

One feature of the disclosed structure is that when the upper surface 12 overlies the modules 10, a firm feel under foot is experienced that is relatively uniform over the middle region of a module 10 and over its edges or peripheral flanges that overlap with those of adjacent modules 10. Preferably, the weight of for example, a pedestrian or player is distributed evenly over multiple frustoconical structures 15 associated with one or more modules.

In some cases, (e.g., FIGS. 5, 6) a module 16 is positioned so its undulating cone top surface 18 engages an underlying foundation or support structure 14. Undulations are provided to enable point contact between the surface 18 and the underlying support surface 14, as contrasted with an area of contact. If desired, apertures 19 can be provided in at least some of the cone bottom surfaces 18 for drainage and weight reduction. One purpose of the rook-like feature is that when there is a hole 19 in the contoured surface, the hole 19 does not plug when placed adjacent to a flat surface such as a concrete floor or flat planar surface 14. If the rook feature is not present then the perforation seals against the flat surface 14 and prevents water from draining through the system.

Once the complete modular system 10 has been installed, it may be covered with an upper surface 12, such as a basketball arena or gymnasium floor or layers of permeable materials like synthetic turf, natural grass, sedum, geotextiles, and the like to create a finished surface that is both functional and aesthetically pleasing. A preferred embodiment has a geo textile both above and beneath the underlayment system 10. The lower geotextile prevents the system 10 from settling into the lower foundation 14 and fine particulates from migrating upward. The upper geotextile prevents the migration of infill materials such as sand and crumb rubber through the carpet and into underlying recesses. Filled, or partially filled recesses, have a reduced ability to attenuate impacts. If desired, the system can utilize green products in the upper surface 12. As used herein the term "green product" includes products that have these among other attributes:

Energy efficient, durable and often have low maintenance requirements.
Free of Ozone depleting chemicals, toxic compounds and don't produce toxic by-products.
Often made of recycled materials or content or from renewable and sustainable sources.
Obtained from local manufacturers or resources.
Biodegradable or easily reused either in part or as a whole.

See, http://www.isustainableearth.com/green-products/what-is-a-green-product

It will be appreciated that the upper surface 12 can be laid across or secured to one or more modules 10. Optionally, a flooring surface 12 can be laminated to the underlayment system 10. In this embodiment, the cone array 15 and male members 46 are covered by the flooring surface 12 and the female members 44 exposed. When the laminated system is snapped together, the sides of the flooring surface butt together, thereby creating a continuous surface. Optionally, anti-friction lugs 23 (FIG. 3) are provided in the upper surface 20 to eliminate or reduce slippage between the energy absorbing module 10 and the upper surface 20. Similarly, anti-friction lugs can be provided in the bottom surface 18 of at least some frustoconical structures 15 to reduce slippage over the lower foundation 14.

Figure 7:
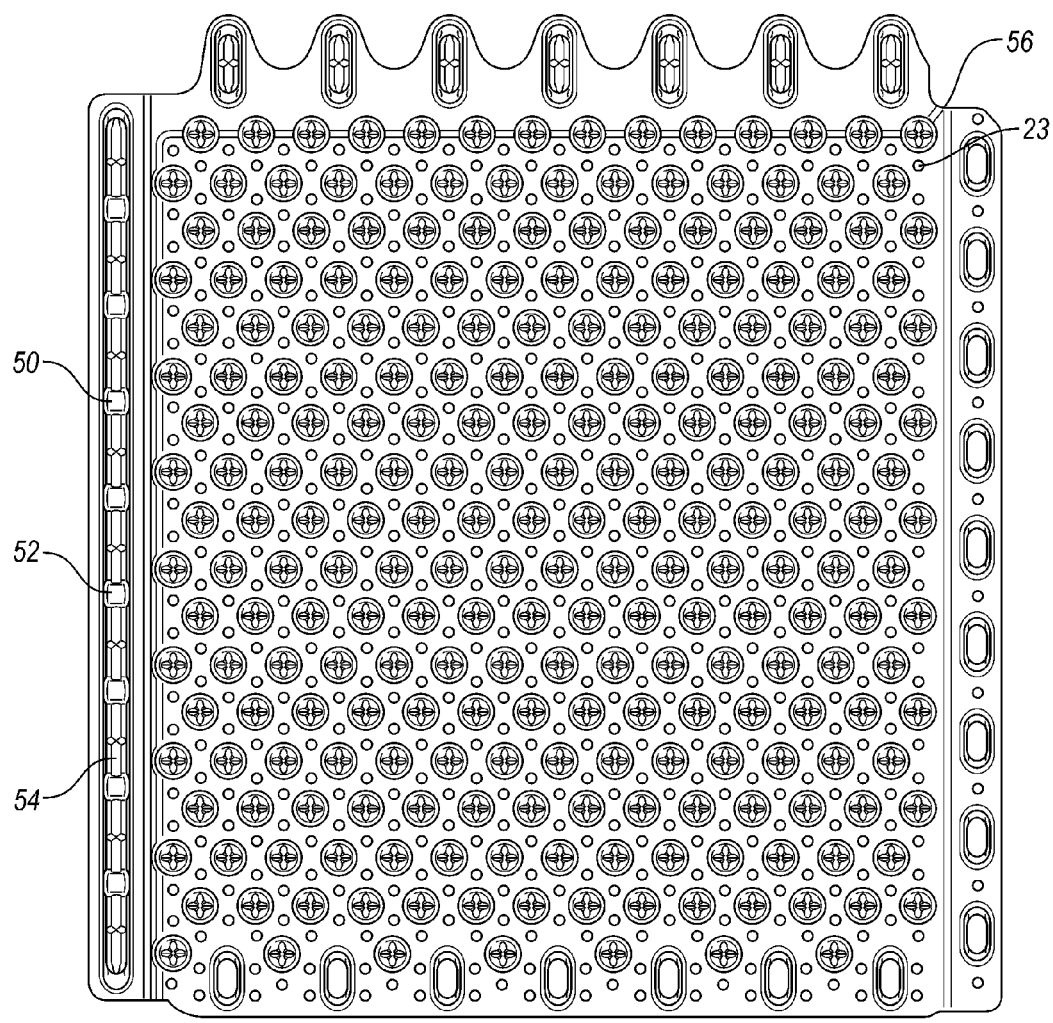
FIG. 7 is a top view of a second embodiment of a single module.
Figure 8:
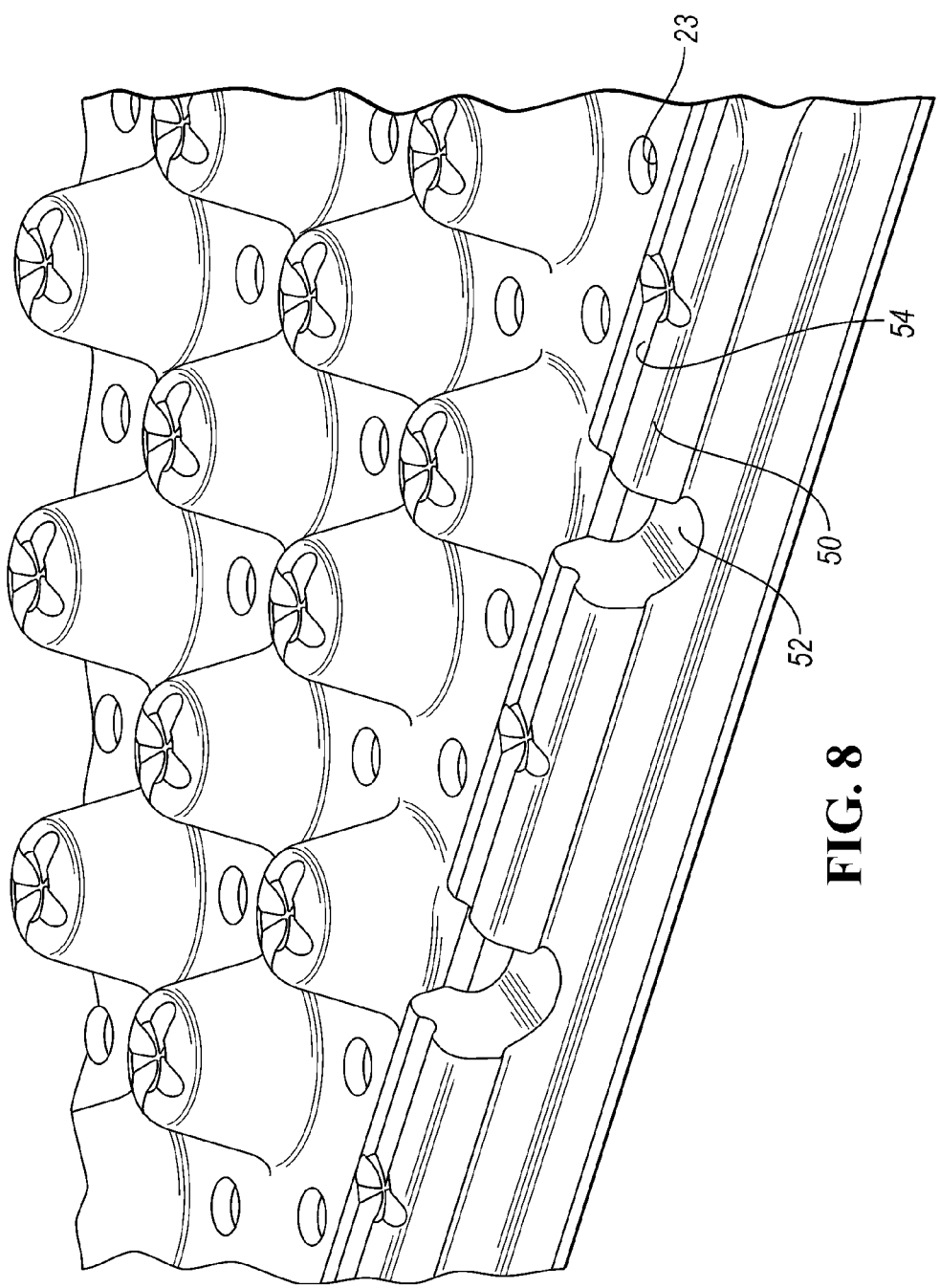
FIG. 8 is an enlarged perspective view of a portion of the second embodiment.
Figure 9:
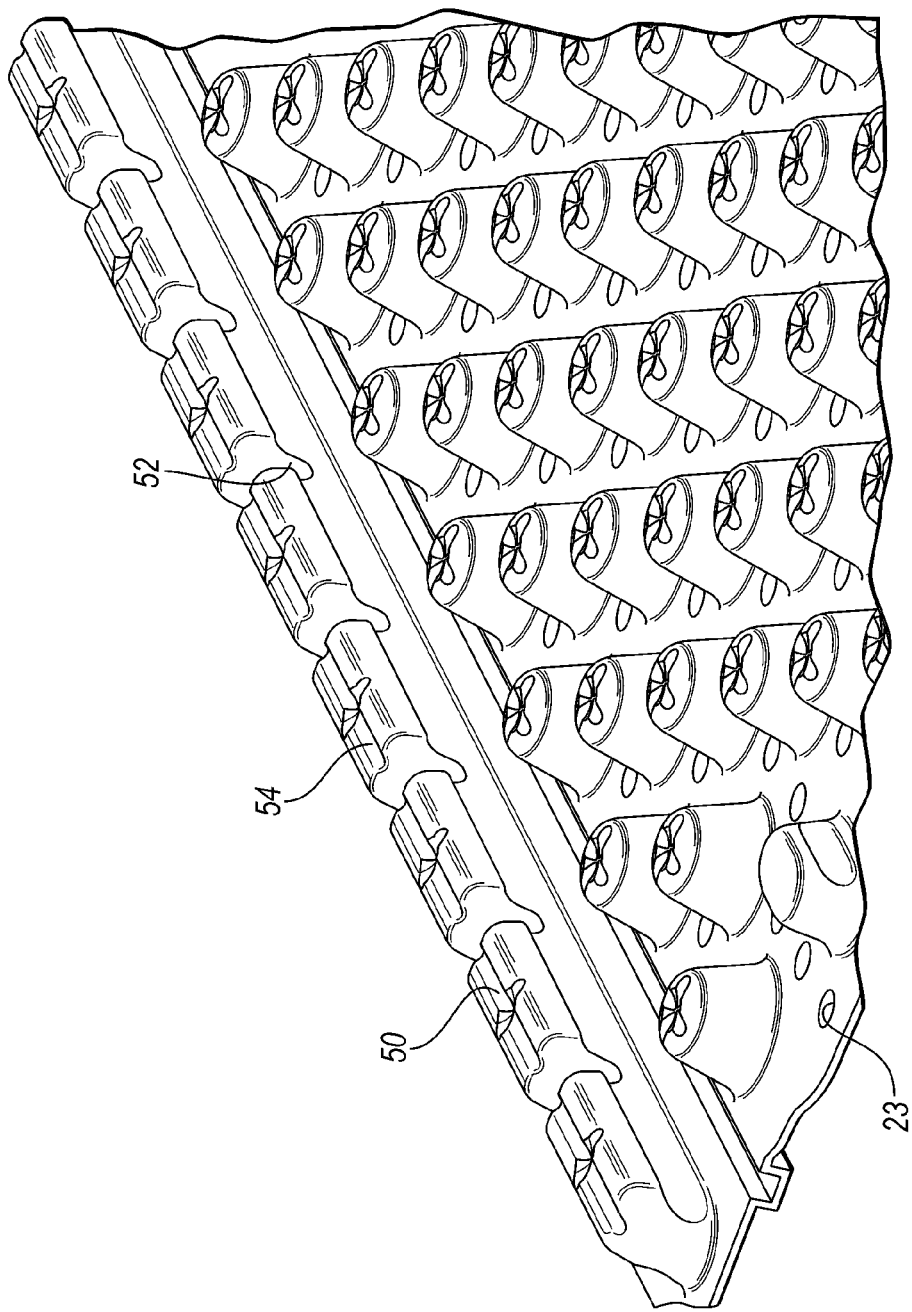
FIG. 9 is also an enlarged view of a portion of the second embodiment as seen from a different vantage point from that of FIG. 8.
Figure 10:
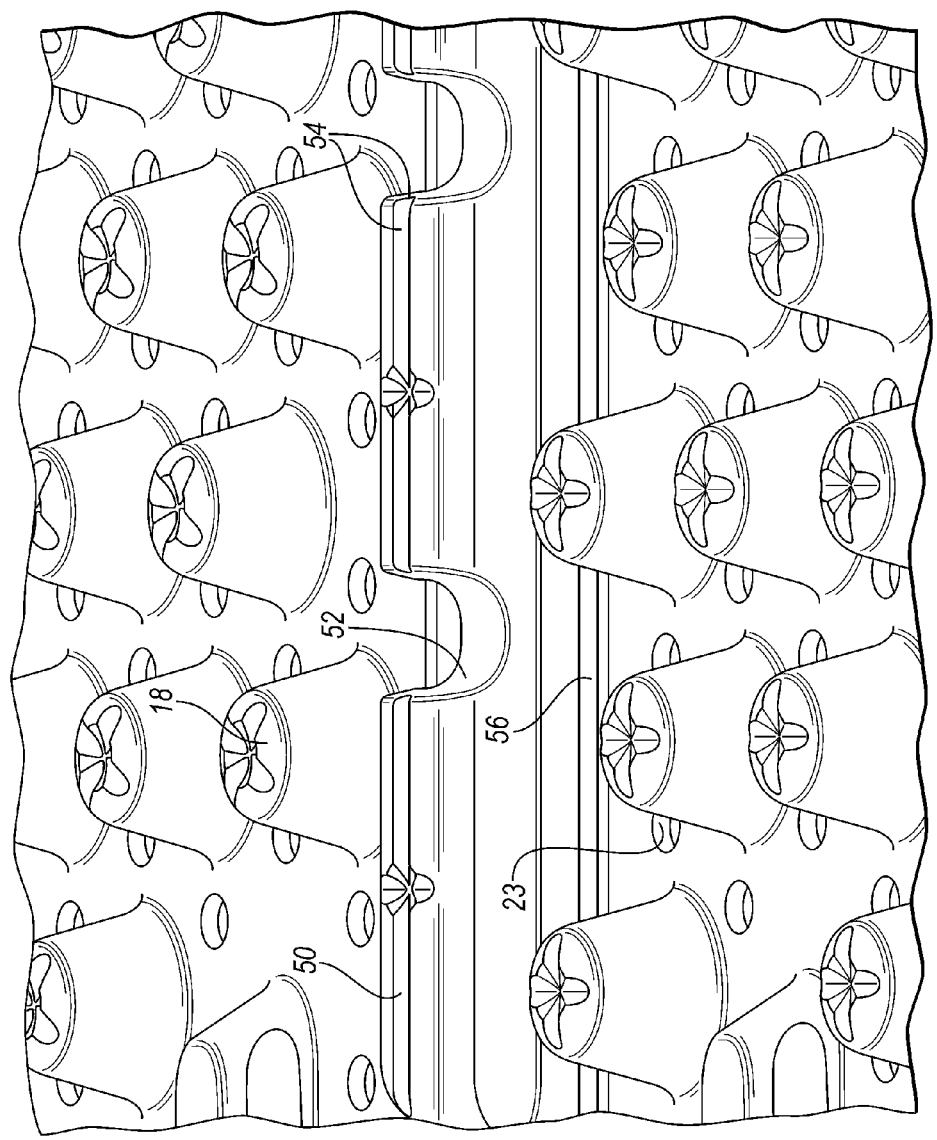
FIG. 10 is an enlarged perspective view of portions of two modules after they are juxtaposed.
Figure 11:
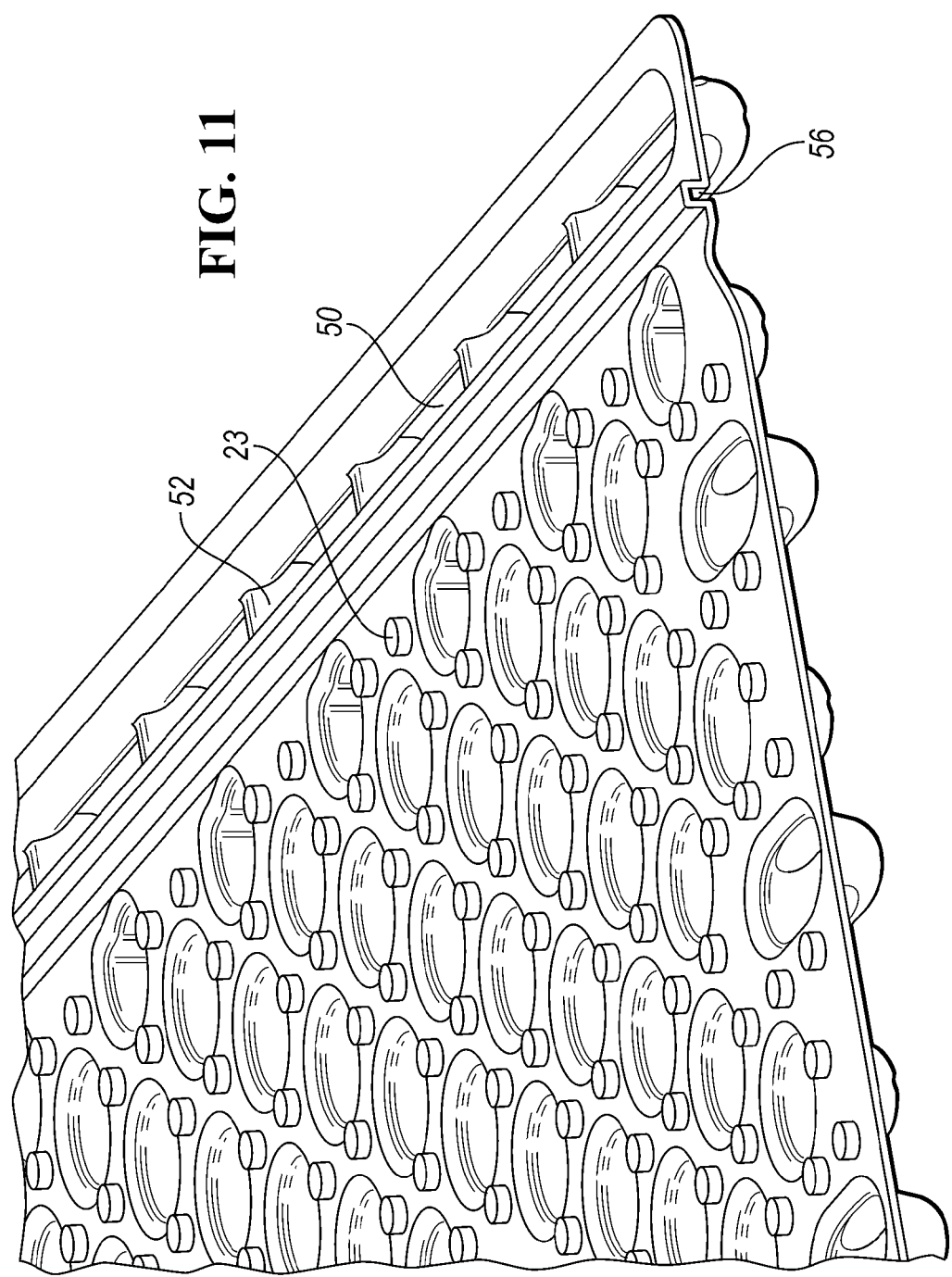
FIG. 11 is a view of the underside of the embodiment depicted in FIG. 8.
Figure 12:
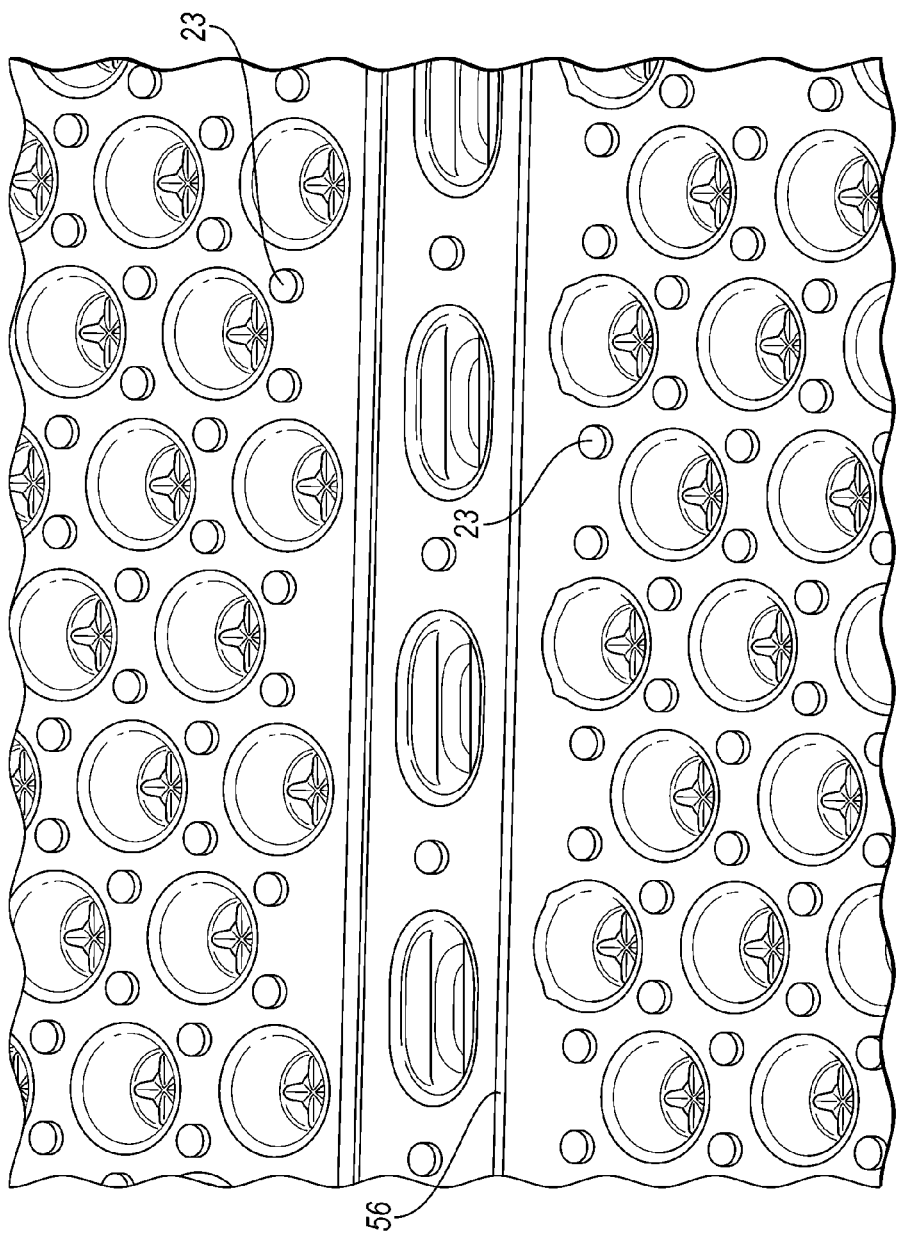
FIG. 12 is a view of the underside of the embodiment depicted in FIG. 10.

This disclosure now turns to other embodiments (FIGS. 7-12), in which a long channel 50 is punctuated by traverse ribs 53. Optionally, longitudinally oriented ribs 55 may be provided between the transverse ribs 53 (FIG. 7). Such structures provide a positive engagement or adequate snap retention between adjacent tiles, panels or modules. Without the ribs 53, the long continuous channel 50 may open up too easily and adjacent tiles may undesirably slide or become separated prematurely. Between the long interlocked channels 50 and the lugs 23 (FIGS. 3, 7) a shallow u-shaped channel 56 runs along one side of the module 16. The channel 56 allows for expansion and contraction perpendicular to the channel 50.

It will be appreciated that the disclosed underlayment system may not only underlie artificial turf but also other flooring systems. The drainage holes 19 are optional. In some applications, for example where the upper impact-receiving surface includes an impermeable surface such as a running track, gym floor, floor tile, etc., there may or may not be a benefit from having the rook top 18. These include turf underlayment, playground underlayment, and other systems where the underlayment lies between a wear surface and a drainage system.

One aspect of the system disclosed is that interaction between plastic and a flat surface may be noisy. For example, the system may flutter when displaced relative to the surface above or below and generate sound at a decibel level that may be objectionable. Therefore, alternate embodiments include a thin foam or felt layer interposed between the upper surface 12 and the disclosed energy absorbing system. For instance, most turf systems are installed over a compacted stone base. In such applications, a permeable non-woven or woven PP geo textile not only deadens the noise but also prevents the disclosed system from settling substantially into the stone base or the stone base from migrating up between the frustoconical structures 15. This thin layer promotes drainage but also prevents relative movement or migration of adjacent layers. In an indoor environment, placement of a foam or felt pad underneath the energy absorbing system would tend to deaden that noise.

It will be appreciated that the underlayment systems may or may not be recoverable. For example, a non-recoverable polypropylene or thermoplastic urethane or other thermoplastic may be suitable for use in basements when moisture and mildew could otherwise be an issue. In such applications, the energy absorber 10 would not crush significantly, let alone recover to or toward an undeflected state. Instead of cushioning the blow by deformation, resistance to impact would be relatively inelastic. Then in the absence of drainage holes, the disclosed system would constitute a reservoir or vapor barrier. As used herein the term "thermoplastic" means "a polymer material that becomes pliable with heat, and with sufficient temperature, a liquid. When cooled, thermoplastics return to solid." See, http://lookup.computerlanguage.com/host_app/search?cid=C999999&term=thermoplastic&lookup.x=0&lookup.y=0

Besides injection molding, one method by which to manufacture the disclosed system is thermoforming. Such approaches enable easy performance tuning by changing sheet thickness and material type that is thermoformed over the tool. It will be appreciated that thermoforming lends itself to rapid high volume manufacturing and low manufacturing costs. Ideally, a polyolefin thermoplastic, such as a polypropylene copolymer, offers an optimal balance of cost and performance. Additional materials may be compounded into the thermoplastic, such as flame retardant packages, to meet customer building codes or performance criteria.

The system can be easily and economically be transported to the job site due to the high packaging density (nesting) of the modules 10. Besides the above advantages, the system is light in weight and low in cost to manufacture.

In summary, the disclosed system offers at least these benefits: minimal installed costs; compatibility with existing foundations; and little to no maintenance.

As required, detailed embodiments of the present invention are disclosed herein; however, it is to be understood that the disclosed embodiments are merely exemplary of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A modular energy absorbing system that is interposed between a lower foundation and an upper impact-receiving surface, the energy absorbing system comprising:
   a plurality of energy absorbing modules that cooperate to absorb at least some impact forces exerted upon the upper impact-receiving surface, the modules also being operable to space apart the upper impact-receiving surface and the lower foundation;
   at least some of the plurality of energy absorbing modules comprising one or more frustoconical support structures, at least some of the frustoconical support structures having a bottom surface and an upper top surface that are connected by a frustoconical sidewall, the upper top surface being operable to coordinate the response of the frustoconical support structures to impact; and
   the upper top surface underlying the upper impact-receiving surface and the bottom surface being juxtaposed with the lower foundation,
   at least some of the energy absorbing modules having edge flanges that define at least one elongated female trough, wherein the female trough includes longitudinal ribs, the edge flanges also defining an elongate male lug that is adapted to engage a female trough of an adjacent module.

2. The modular energy absorbing system of claim 1 wherein the upper top surface is substantially parallel with the bottom surface of at least one of the frustoconical support structures.

3. The modular energy absorbing system of claim 1, further including lugs and grooves that are provided in the male protuberances and female troughs to offer a snap-fit engagement mechanism between adjacent modules.

4. The modular energy absorbing system of claim 1, wherein the female trough includes transverse ribs.

5. The modular energy absorbing system of claim 1, wherein the energy absorbing modules include a number (n) of modules, where $1 < n < 1,000,000$).

6. The modular energy absorbing system of claim 1, wherein the upper impact-receiving surface is positioned atop the frustoconical support structures, the upper impact-receiving surface being selected from the group consisting of a basketball court, a football field, a baseball field, one or more layers of permeable materials, synthetic turf, natural grass, sedum, geotextiles, and green products.

7. The modular energy absorbing system of claim 1, further comprising anti-friction lugs extending from the upper top surface that engage the upper impact-receiving surface to reduce slippage therebetween.

8. The modular energy absorbing system of claim 1, further comprising anti-friction lugs extending from the bottom surface that engage the lower foundation to reduce slippage therebetween.

9. The modular energy absorbing system of claim 1, in which one or more sidewalls have an impact response characteristic that is selected from the group consisting of buckling in response to impact and springing back to or towards an undeflected configuration after the impact and being undeflected in response to the impact.

10. The modular energy absorbing system of claim 1, further including:
    the lower foundation and
    the upper impact-receiving surface.

11. The modular energy absorbing system of claim 1, wherein the bottom surfaces of at least some of the frustoconical support structures are configured like a rook with crenellations having upper edges that are generally co-planar and are adapted to lie adjacent to the lower foundation.

12. The modular energy absorbing system of claim 1, wherein the bottom surfaces of at least some of the frustoconical support structures are provided with undulations that are adapted to lie in point contact with the lower foundation.

13. The modular energy absorbing system of claim 1, wherein the bottom surfaces of at least some of the frustoconical support structures are provided with apertures for drainage and weight reduction.

14. The modular energy absorbing system of claim 1, further including an intermediate layer selected from the group consisting of a geo textile, a thin foam, a felt layer and combinations thereof positioned above or below or both above and below the frustoconical support structures.

15. A modular energy absorbing system that is interposed between a lower foundation and an upper impact-receiving surface, the energy absorbing system comprising:
    a plurality of energy absorbing modules that cooperate to absorb at least some impact forces exerted upon the upper impact-receiving surface, the modules also being operable to space apart the upper impact-receiving surface and the lower foundation;

at least some of the plurality of energy absorbing modules comprising one or more frustoconical support structures, at least some of the frustoconical support structures having a bottom surface and an upper top surface that are connected by a frustoconical sidewall, the upper top surface being operable to coordinate the response of the frustoconical support structures to impact, the upper top surface underlying the lower foundation and the bottom surface being juxtaposed with the upper impact-receiving surface; and at least some of the energy absorbing modules having edge flanges that define at least one elongated female trough, wherein the female trough includes longitudinal ribs, the edge flanges also defining an elongate male lug that is adapted to engage a female trough of an adjacent module.

* * * * *